US007016399B1

(12) United States Patent
Vadgama et al.

(10) Patent No.: US 7,016,399 B1
(45) Date of Patent: Mar. 21, 2006

(54) RECEIVING APPARATUS INCLUDING ADAPTIVE BEAMFORMERS

(75) Inventors: Sunil Keshavji Vadgama, Thornton Heath (GB); Yingjie Jay Guo, Aylesbury (GB)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/857,052

(22) PCT Filed: Nov. 17, 1999

(86) PCT No.: PCT/GB99/03839

§ 371 (c)(1),
(2), (4) Date: May 29, 2001

(87) PCT Pub. No.: WO00/33481

PCT Pub. Date: Jun. 8, 2000

(30) Foreign Application Priority Data

Nov. 30, 1998 (GB) .................................. 9826270

(51) Int. Cl.
*H04B 1/69* (2006.01)
(52) U.S. Cl. ...................... 375/148; 375/147; 367/138; 342/81; 342/373
(58) Field of Classification Search ............... 375/148, 375/150, 350, 259, 343, 144, 147; 600/437, 600/443, 454, 447; 342/81, 373, 380; 367/138
See application file for complete search history.

(56) References Cited

U.S. PATENT DOCUMENTS 4,996,532 A * 2/1991 Kirimoto et al. ............. 342/81

(Continued)

FOREIGN PATENT DOCUMENTS

EP          0595247          5/1994

(Continued)

OTHER PUBLICATIONS

"Performance of Wireless CDMA with M-ary Orthogonal Modulation and Cell Site Antenna Arrays", Naguib A.F. et al, IEEE Journal on Selected Areas in Communications, US, IEEE Inc. N.Y., vol. 14, No. 9, pp 1770-1783, XP000639640, ISSN: 0733-8716.

(Continued)

*Primary Examiner*—Stephen Chin
*Assistant Examiner*—Ted M. Wang
(74) *Attorney, Agent, or Firm*—Katten Muchin Rosenman LLP

(57) ABSTRACT

Receiving apparatus, for receiving a transmission signal in a cellular mobile communications system, comprises a main beamformer ($6_M$, $14_M$) which processes received signals, representing the said transmission signal, in accordance with a main beam pattern. This main beam pattern is determined by beam control information applied to the main beamformer. The main beam pattern is adjusted as necessary during use of the receiving apparatus to facilitate reception of the said transmission signal.

The apparatus also has three assistant beamformers ($6_{A1}$, $14_{A2}$; $6_{A2}$, $14_{A2}$; $6_{A3}$, $14_{A3}$) that, in an initial operating phase of the apparatus, process such received signals in accordance with three different assistant beam patterns. Each such pattern is determined by beam control information ($W_1$–$W_{33}$) corresponding individually thereto. The three assistant beamformers produce output signals ($O_{A1}$, $O_{A2}$, $O_{A3}$) corresponding respectively to the different assistant beam patterns.

A beam control information setting unit (16, 20) employs the output signals and the beam control information ($W_{11}$ to $W_{33}$) corresponding respectively to the said assistant beam patterns to make an initial estimate of the beam control information for the main beamformer.

Such receiving apparatus can permit fast setup of the initial beam control information for the main beamformer.

36 Claims, 11 Drawing Sheets

U.S. PATENT DOCUMENTS

| | | | |
|---|---|---|---|
| 5,493,307 A * | 2/1996 | Tsujimoto | 342/380 |
| 5,649,287 A | 7/1997 | Forssen | |
| 5,917,446 A * | 6/1999 | Greenspan | 342/373 |
| 6,111,816 A * | 8/2000 | Chiang et al. | 367/7 |
| 6,428,477 B1 * | 8/2002 | Mason | 600/437 |

FOREIGN PATENT DOCUMENTS

| | | |
|---|---|---|
| EP | 0670608 | 9/1995 |
| WO | 98 27669 | 6/1998 |

OTHER PUBLICATIONS

"Spatial Utilization and Suppression of Multipath Signals by Maximal-Ratio-Combining Digital-Beamformer for-Mobile Radios", IEICE Transactions on Communications, JP, Institute of Electronics, Information and Comm. Eng. Tokyo, vol. E81-B, No. 4, Apr. 1, 1998, pp 806-810, XP000780476, ISSN: 0916-8516.

Paper entitled "An Adaptive Array Antenna Using Combined DFT and LMS Algorithm", K. Watanabe, I. Yoshil, and R. Kohno, Annual EIT Conference of Telecommunications, 1997.

* cited by examiner

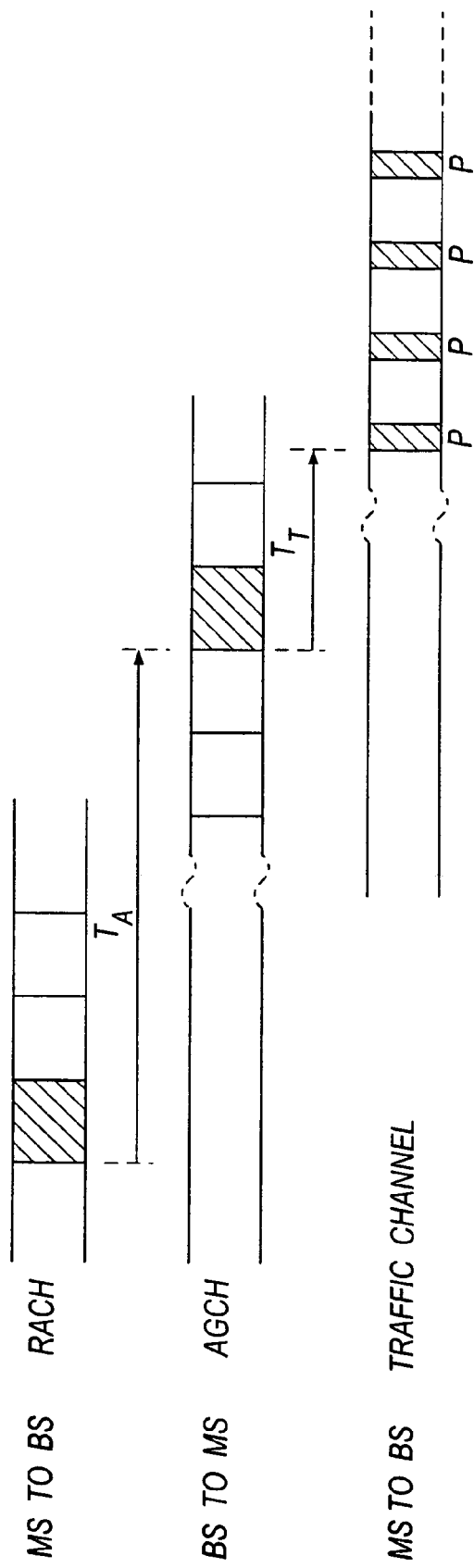

RECEIVING APPARATUS INCLUDING ADAPTIVE BEAMFORMERS

BACKGROUND OF THE INVENTION

1. Field of the Invention

The present invention relates to receiving apparatus including adaptive beamformers. In particular, the present invention can provide receiving apparatus for use in a base station of a cellular mobile communication system.

2. Description of the Related Art

In a cellular mobile communications system, one of the main tasks of the base station is to detect the signal of each wanted user (i.e. each active mobile station) in a multi-user and multi-path environment. In order to achieve satisfactory signal detection at low bit error rates, two conditions must be satisfied. Firstly, the power level of the signal received by the base station from the mobile station must be greater than a certain threshold value. Secondly, the multi-user interference (MUI), sometimes referred to also as multiple access interference (MAI), must be reduced to an acceptable level.

To satisfy the two conditions identified above, it is effective to use adaptive beamformers in general and digital beamformers in particular. The principle underlying a digital beamformer is to form a spatial beam pattern in such a way that the angles of arrival of wanted signals fall well within a main lobe of the beam pattern whereas the interfering signals are located as much as possible in the nulls, low side lobes or boundary regions of the main lobe.

FIG. 1 of the accompanying drawings shows parts of a previously-considered digital beamformer. A plurality of independent sensors (antenna elements $2_1$ to $2_4$) are provided to detect, at different points in space, a transmission signal sent to the base station by a mobile unit (not shown in FIG. 1). The antenna elements $2_1$ to $2_4$ permit sampling of the received signal in space. The respective receive signals produced by the antenna elements $2_1$ to $2_4$ are digitised (e.g. by RF down-converters not shown) and then applied to the digital beamformer 6 which is employed as a spatial filter.

The digital beamformer 6 includes a set of complex number multipliers 8 connected respectively for receiving the different antenna signals. Each complex number multiplier multiplies its antenna signal by a weight value W set by a weight setting unit 12 of the beamformer 6. The resulting outputs of the multipliers 8 are then combined by a combiner 10 to produce an output signal of the digital beamformer. The object of the spatial filtering carried out by the digital beamformer 6 is to optimise the beam former response with respect to some prescribed criterion so that noise and interference are minimised in the output signal.

A subtractor 11 subtracts a reference signal from the output signal of the digital beamformer to produce an error signal. The weight setting unit 12 receives the error signal and the receive signals from the antenna elements $2_1$ to $2_4$ and processes them to derive the weight values $W_1$ to $W_4$ applied to the complex number multipliers 8.

In a steady-state condition, in which the wanted and interfering signals each have a fixed angle of arrival at the receiving apparatus, there will be a fixed optimum set of beamformer weight values $W_1$ to $W_4$ which satisfies the prescribed criterion for minimising noise and interference at the output of the beam former. An adaptation algorithm is employed in the weight setting unit 12 which, in the above steady-state condition, would cause the weight values to converge to their optimum steady-state values and, thereafter, the noise and interference at the output of the beamformer would remain at a minimum level related to the number of weights. However, in practice, multi-path propagation means that the transmission channel between the subject mobile unit and the base station is time-variant and, furthermore, the positions of the interfering signal sources (for example other mobile stations) will change, with respect to one another and the base station, over time. Accordingly, using its adaptation algorithm, the weight setting unit 12 is required to update the beamformer weight values continuously in accordance with the changing operating parameters.

Incidentally, further information about digital beamforming techniques and related adaptive algorithms can be found, for example, in "Digital beamforming in wireless communications", John Litra and Titus Kwok-Yeung Lo, Artech House Publishers, 1996, ISBN: 0-89006-712-0, the content of which is incorporated herein by reference.

In practice, when a base station is expecting to receive a signal from a wanted user, it initially has no idea of the direction from which that signal will come. Thus, it is inappropriate to point the initial beam pattern, which is determined by the initial weight setting of the digital beamformer, to any particular direction. However, if an omnidirectional initial beam pattern is used, the level of the MUI can be so high that it takes a long time for the adaptation algorithm to converge, which inevitably leads to long delay and/or waste of bandwidth.

A paper entitled "An adaptive array antenna using combined DFT and LMS Algorithm" by K Watanabe, I Yoshii, and R Johno, Annual EIT Conference of Telecommunications, 1997, discloses a two-stage approach for determining beam directions in a TDMA communications system. In the first stage, in place of a digital beamformer (weighted summing circuit) discrete fourier transform (DFT) processing is applied to the received signals so as to effectively form plural fixed beams. The results of the DFT processing are used to establish the initial weight factors for the second stage which involves Least Mean Square (LMS) processing of the received signals. This two-stage approach is partially effective in improving the convergence of the beamformer weights. However, it suffers from the following serious limitations. Firstly, it is necessary for all the beams formed during DFT processing to be produced simultaneously, making the hardware construction of the receiving apparatus expensive. Secondly, the number of fixed beams is limited to being no greater than the number of antenna elements. Thirdly, there is no control over the beam shapes and pointing directions during the DFT processing. In particular, there is no freedom in choosing the "look-directions" of the antenna elements and the parameter d/λ independently (d is the inter-element spacing and λ is the operating wavelength). This lack of control effectively limits the DFT approach to use in switched beam and multi-beam antennas only when the beams are pointed to certain directions and no sidelobe control is needed. In practice the antenna elements must therefore be evenly spaced and placed on a plane. Fourthly, the DFT approach is not fully effective in the case in which two or more of the fixed beams provide comparably-good signals.

Accordingly, it is desirable to provide a technique which enables the base station beamformer to set up its initial weights quickly, thus reducing the convergence time and the demand for long pilot signals, without the limitations mentioned above.

SUMMARY OF THE INVENTION

According to a first aspect of the present invention there is provided receiving apparatus, for receiving a transmission signal in a cellular mobile communications system, comprising: main beamformer means operable to process received signals, representing the said transmission signal, in accordance with a main beam pattern that is determined by beam control information applied thereto, the said main beam pattern being adjusted as necessary during use of the receiving apparatus to facilitate reception of the said transmission signal; assistant beamformer means operable, in an initial operating phase of the apparatus, to process such received signals in accordance with each one of a plurality of different assistant beam patterns to derive one or more output signals corresponding to the assistant beam pattern concerned, each such pattern being determined by beam control information corresponding individually thereto; and beam control information setting means operable to employ the said output signals and the said beam control information corresponding respectively to the said assistant beam patterns to make an initial estimate of the said beam control information for the said main beamformer means.

According to a second aspect of the present invention there is provided a method of receiving a transmission signal in a cellular mobile communications system, in which received signals representing the said transmission signal are processed in accordance with a main beam pattern that is determined by beam control information corresponding thereto, and the main beam pattern is adjusted as necessary to facilitate reception of the said transmission signal; the method including an initialisation step of: processing such received signals in accordance with each one of a plurality of different assistant beam patterns to derive one or more output signals corresponding to the assistant beam pattern concerned, each such pattern being determined by beam control information corresponding individually thereto; and employing the said output signals and the said beam control information corresponding respectively to the said assistant beam patterns to make an initial estimate of the said beam control information corresponding to the said main beam pattern.

In receiving apparatus and a receiving method embodying the present invention fast convergence of the beam control information (weight values) for the main beamformer is achieved reliably without the limitations inherent in the above-mentioned two-stage DFT and LMS approach. In particular, the same assistant beamformer can, if desired, be used in serial fashion to form the fixed beams (assistant beam patterns), leading to cost savings. The number of assistant beam patterns can also be greater than the number of antenna elements (received signals). Because each assistant beam pattern is determined by its own individually-corresponding beam control information (weight values) the pointing directions, shapes and widths of the assistant beamformers can be optimally controlled and independently designed according to demand. For example, it may be desired to change the assistant beam patterns from time to time in the course of a 24-hour period to cater for different traffic conditions. Also, each base station site is unique and so it is important to have total freedom in choosing the assistant beam patterns independently of one another. Furthermore, the antenna elements can be unevenly spaced and do not need to be placed uniformly in a single plane.

BRIEF DESCRIPTION OF THE DRAWINGS

FIG. 11 is a waveform diagram for use in explaining communications between a mobile station and a base station at the time a channel is first activated.

DETAILED DESCRIPTION OF THE PREFERRED EMBODIMENTS

Figure 2:
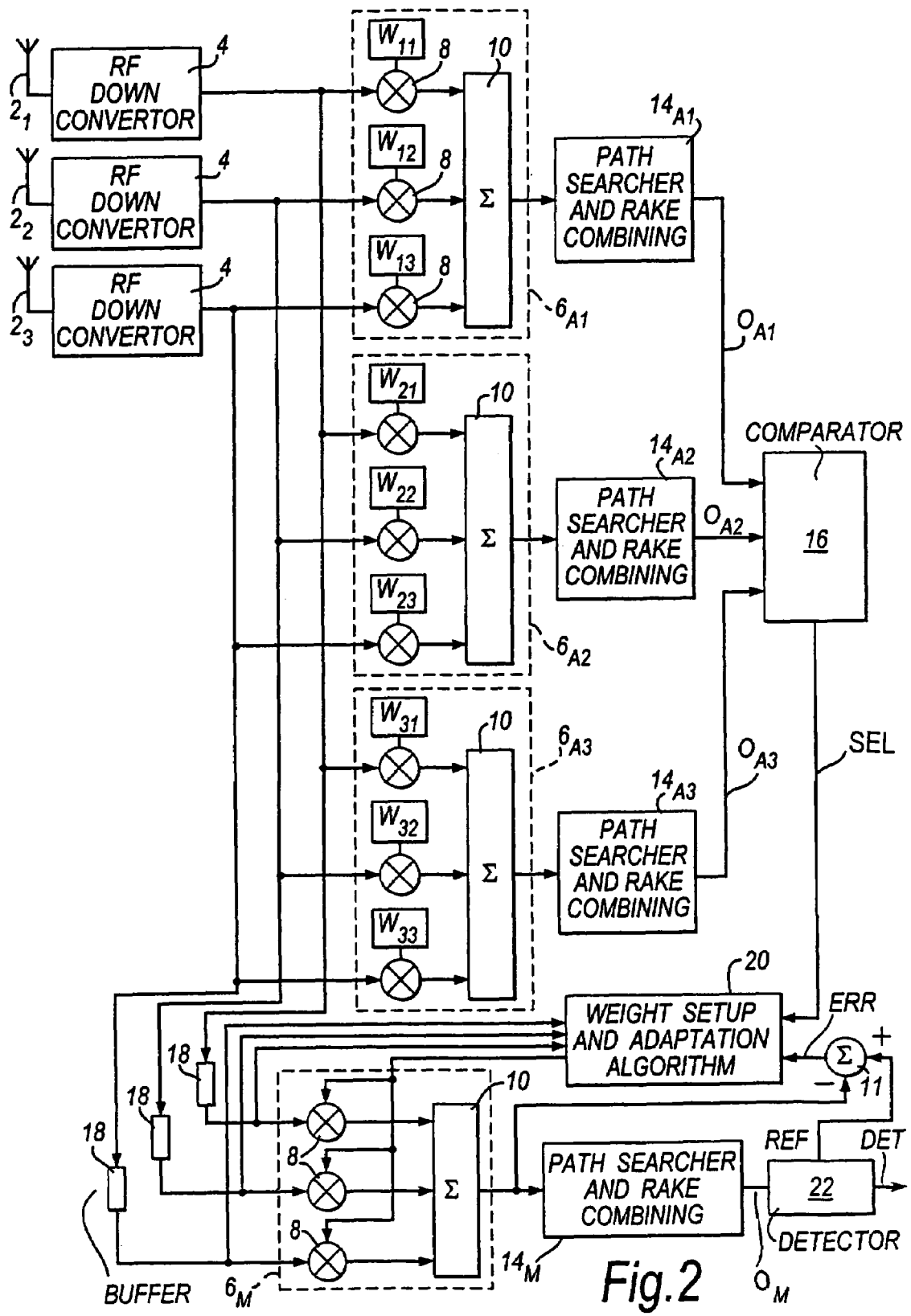
FIG. 2 is a block diagram showing parts of receiving apparatus according to a first embodiment of the present invention.

FIG. 2 shows parts of receiving apparatus according to a first embodiment of the present invention. This embodiment is intended for use in a cellular mobile communications system which combines pilot-symbol-assisted modulation (PSAM) with direct-sequence code-division-multiple-access (DS-CDMA). This DS-CDMA PSAM system may, for example, have the following specification:

Modulation method—quadrature phase shift keying (QPSK), pilot-symbol-assisted coherent detection;
Chip rate=4.096 Mchips/s;
Symbol rate=32 kbits/s.

In such a CDMA system, a pseudo-noise (PN) spreading code is used to spread the transmission signal at the mobile station. This spreading code is known to the receiving apparatus, enabling it to decode (or despread) the spread transmission signal received from the mobile station. Further information on spreading and despreading in DS-CDMA systems can be found, for example, in "CDMA—principles of spread spectrum communications", Andrew J Viterbi, Addison-Wesley Publishing Co., 1995, ISDN: 0-201-63374-4, the content of which is incorporated herein by reference.

In a PSAM system, known pilot symbols are periodically inserted into the user data stream for the purposes of obtaining channel information. The receiving apparatus is able to estimate the attenuation and phase rotation for each of the received pilot symbols, which provides a mechanism for compensation of the fading envelope and phase. Further information on PSAM may be found, for example, in "Modern quadrature amplitude modulation—principles and applications for fixed and wireless communications", William T Webb and Lajos Hanjo, Pentech Press and IEEE Press 1994/95, ISBN: 0-7273-1701-6, the content of which is incorporated herein by reference.

As shown in FIG. 2 the receiving apparatus according to the first embodiment comprises three antenna elements $2_1$ to $2_3$ which are connected to respective RF down-converters 4. These RF down-converters are connected in turn to a set of beamformers 6.

Figure 1:
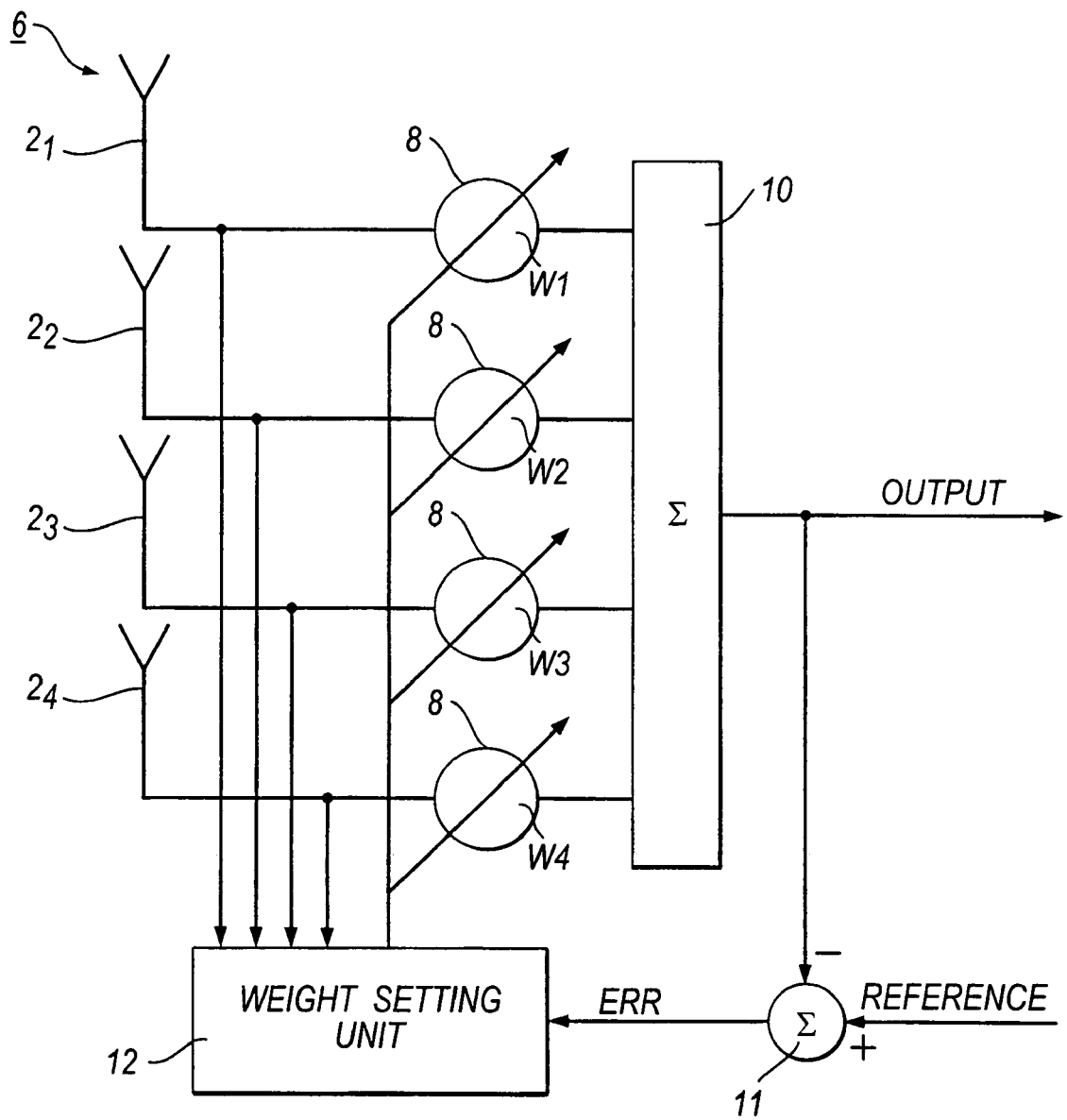
FIG. 1, discussed hereinbefore, shows parts of a previously-considered digital beamformer.

This set of beamformers comprises respective first, second and third assistant beamformers $6_{A1}$ to $6_{A3}$, and a main beamformer $6_M$. Referring to FIG. 2, the constitution of each of the beamformers $6_{A1}$, $6_{A2}$, $6_{A3}$ and $6_M$ can be seen. Each beamformer has essentially the same constitution as described above with reference to FIG. 1. The beamformer has three digital inputs corresponding respectively to the three different antenna elements $2_1$ to $2_3$. In the case of the assistant beamformers $6_{A1}$ to $6_{A3}$, each of these beamformer inputs is connected directly to the digital output of the RF down-converter 4 for its corresponding antenna element. In the case of the main beamformer $6_M$, on the other hand, each beamformer input is connected to one of the RF down-converters via a buffer 18, the purpose of which will be described later.

The beamformer inputs in this embodiment are adapted to receive in phase and quadrature (I and Q) digital signal pairs.

The beamformer inputs are coupled to respective complex number multipliers 8 which also receive respective weight values. In the case of the assistant beamformers $6_{A1}$ to $6_{A3}$ the weight values $W_{11}$ to $W_{33}$ are fixed (predetermined). For the weight values W the first digit of the suffix denotes the number of the assistant beamformer and the second digit of the suffix denotes the number of the antenna element. Thus, for example, the weight value $W_{12}$ is applied to the complex number multiplier 8 of the first digital beamformer $6_{A1}$ that is used to process the signal produced by the second antenna element $2_2$.

In the case of the main beamformer $6_M$, the weight values are variable (not fixed) and are adjusted as necessary during use of the apparatus. These weight values are supplied to the main beamformer $6_M$ by a weight setup and adaptation algorithm portion 20 (also described in more detail later).

Returning to FIG. 2, the outputs of the first, second and third assistant beamformers $6_{A1}$ to $6_{A3}$ are supplied to respective first, second and third path searcher and RAKE combiner portions $14_{A1}$ to $14_{A3}$. The output of the main beamformer $6_M$ is supplied to a further path searcher and RAKE combiner portion $14_M$. The output of the main beamformer $6_M$ is also connected to the negative input of a subtractor 11.

Respective output signals $O_{A1}$, $O_{A2}$ and $O_{A3}$ of the first, second and third path searcher and RAKE combiner portions $14_{A1}$ to $14_{A3}$ are applied to inputs of a comparator 16. A selection signal SEL produced by the comparator 16 is applied to an input of the above-mentioned weight setup and adaptation algorithm portion 20.

An output signal $O_M$ of the main beamformer path searcher and RAKE combiner portion $14_M$ is applied to an input of a detector 22. The detector 22 produces a detection signal DET, representing the detected transmission signal from the mobile station, as well as a reference signal REF which is applied to a positive input of the subtractor 11. An error signal ERR produced by the subtractor 11 is applied to an input of the weight setup and adaptation algorithm portion 20.

Incidentally, it is also possible for the detection signal DET and the reference signal REF to be one and the same signal, depending on the adaptation algorithm embodied in the weight setup and adaptation algorithm portion 20.

Operation of the first embodiment described above with reference to FIG. 2 will now be explained. In mobile communications environments, reflectors are inevitably present which lead to multi-path propagation of the transmission signal from the mobile station to the base station. These different paths will have different lengths and directions and, accordingly, the base station receives a succession of reflections of the transmission signal which have different respective delays and angles of arrival. The path searcher and RAKE combiner portions 14 shown in FIG. 2 having, for example, four fingers are intended to enable the receiver to lock on to the four best paths between the mobile station and the base station, i.e. the four strongest versions of the transmission signal, and to produce an output signal for each path.

When the base station is expecting to receive data from a wanted user (mobile station), the first, second and third assistant beamformers are activated to form a number of beam patterns ("assistant beam patterns") simultaneously, each assistant beam pattern effectively pointing to a predetermined direction in a specified sectorial range. The beam width of each assistant beam pattern should be large enough, for example greater than 15° for macrocells, to intercept most of the multi-path signals from any wanted user, as well as being well overlapped so that the signal from a wanted user in any direction will be received with a satisfactory power level.

Figure 4:
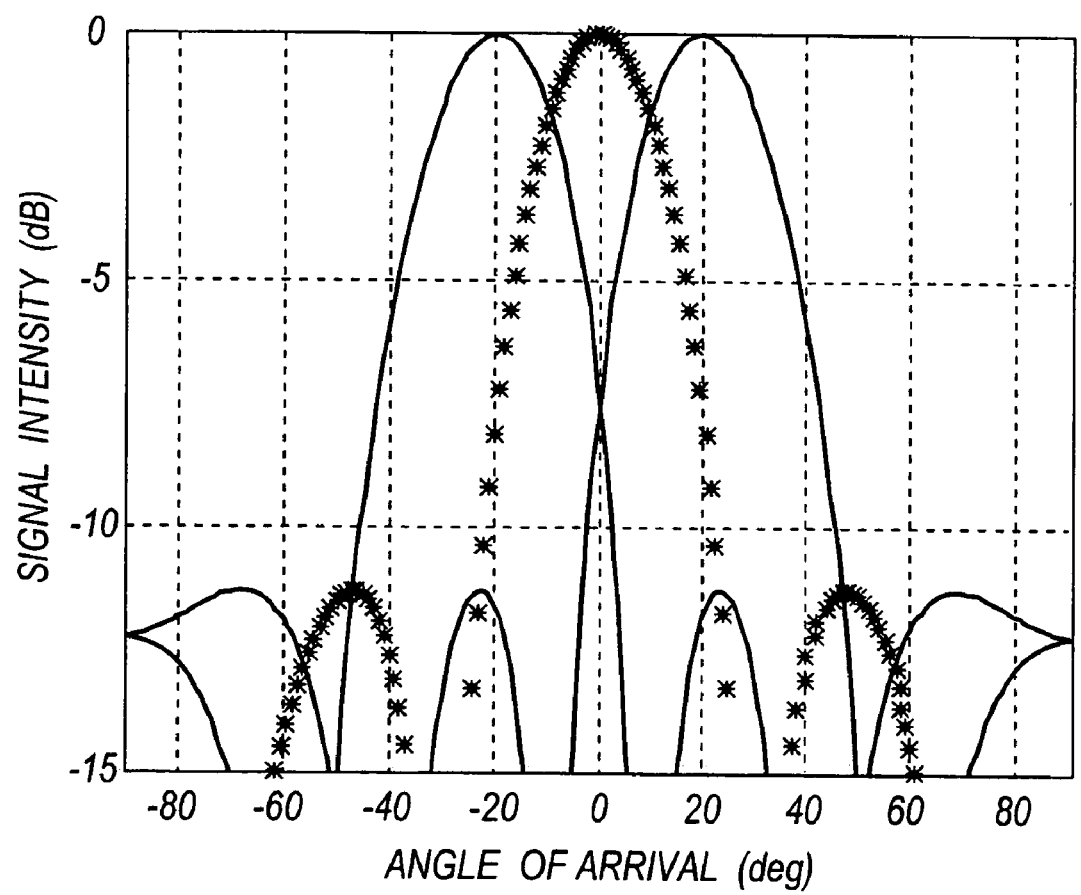
FIG. 4 is a graph showing one example of beam patterns produced by the first embodiment of the present invention.

By way of example, FIG. 4 shows three assistant beam patterns covering a 60° sector. In FIG. 4, the sector to be covered extends from −30° to +30°. The main beams of the three assistant beam patterns are centered respectively on −20°, 0° and +20°. According to this beam pattern arrangement, the intensity of the received signal from any user in the sector concerned will not be reduced by more than 2 dB from its maximum value. Incidentally, in FIG. 4, the low peaks (below −10 dB) represent side lobes of the assistant beam patterns.

The assistant beam patterns are determined by the weight values $W_{11}$ to $W_{33}$ applied to the complex number multipliers 8 in the assistant beamformers concerned. In order to form a set of assistant beam patterns pointed in different directions, the weights of the assistant beamformers can have the same magnitude distribution but different respective phase distributions. The magnitude distribution can be either uniform, which leads to a narrow main beam but high side lobes, or non-uniform such as the Taylor distribution, which leads to a wider main beam and low side lobes. Further information relating to how the beam patterns are determined can be found, for example, in "Phase array antenna handbook", R J Mailloux, Artech House Publishers, 1994.

The respective digital signals (I-Q signal pairs) produced by the RF down-converters 4 of the different antenna elements $2_1$ to $2_3$ are multiplied, using the complex number multipliers 8, by the appropriate weight values and then combined by the combiner 10 to produce an output signal of the assistant beamformer concerned.

The path searcher and RAKE combiner portion $14_{A1}$ receives output signals from the first assistant beamformer and identifies the four best signals obtained within the assistant beam pattern formed by the first assistant beamformer.

Incidentally, it may be that, within that assistant beam pattern, there are not four acceptable signals. In this case, the path searcher and RAKE combiner portion $14_{A1}$ will deactivate one or more of its fingers so as to reduce noise and conserve power.

The signals selected by the path searcher are then combined appropriately in the portion $14_{A1}$ to produce a combined output signal $O_{A1}$ for the first assistant beamformer.

The same operations are performed in parallel by the second and third path searcher and RAKE combiner portions $14_{A2}$ and $14_{A3}$.

When the multi-path signals of a wanted user (mobile station) arrive at the base station, one or possibly two of the path searcher and RAKE combiner portions $14_{A1}$ to $14_{A3}$ will produce the "best" output signal(s) (representation(s) of the wanted signal). The best signal(s) can be determined by reference to one or more of the following quality measures: the carrier-interference ratio (CIR) of each output signal $O_{A1}$ to $O_{A3}$; the signal-noise and interference ratio (SNIR); the bit error rate (BER); and the signal strength (SS). It would also be possible to compare two or more measures in combination or in order of significance. For example, it would be possible to compare the CIR of the assistant beamformer output signals $O_{A1}$ to $O_{A3}$ first and then go on to compare the signal strengths of the output signals only if the CIR comparison alone is inconclusive.

If the result of the comparisons performed by the comparator 16 is that just one of the output signals clearly represents the best signal, the comparator 16 delivers to the weight setup and adaptation algorithm portion 20 a selection signal SEL identifying the assistant beamformer that produced that one signal.

If, however, two or more of the assistant beamformers produce comparably-good output signals, the selection signal SEL produced by the comparator 16 identifies each of the assistant beamformers concerned.

In the weight setup and adaptation algorithm portion 20, the selection signal SEL produced by the comparator 16 is analysed. If the selection signal identifies just one "best" output signal, the initial weight values of the main beamformer $6_M$ in each finger are simply made equal to the weight values of the assistant beamformer which produced that best signal. Thus, the main beam pattern is initially the same as the assistant beam pattern produced by that assistant beamformer.

If, on the other hand, the selection signal SEL identifies two assistant beamformers as having produced comparably-good output signals, it follows that the signals of the wanted user are coming from somewhere between the directions of the two assistant beamformers concerned and an interpolation process is then used to produce the initial weight settings for the main beamformer. In this interpolation process, the initial direction of the main beam pattern can simply be set to halfway between the directions of the two assistant beam patterns. Alternatively, the two assistant beam patterns can be "weighted" in accordance with their respective output-signal quality measures (e.g. CIR, SNIR) to arrive at a predicted initial main beam pattern having direction intermediate between the respective directions of the two assistant beam patterns.

Incidentally, if desired, the interpolation process can be applied to more than two comparably-good output signals.

The initial weight settings arrived at by the weight setup and adaptation algorithm portion 20 are then supplied to the main beamformer $6_M$, whereafter a normal adaptation process is started within the weight setting and adaptation algorithm portion 20. In this adaptation process the error signal ERR produced by the subtractor 11 is employed as a feedback signal, so that a feedback loop (including the path searcher and RAKE combiner portion $14_M$, the detector 22 and the weight setup and adaptation algorithm 20) is created. By virtue of this feedback loop the initial main beam pattern is optimised and then updated dynamically to track the motion of the mobile station and channel variation, so as to optimise the main beamformer response with respect to some prescribed criterion (e.g. SIR).

When the adaptation process starts, the assistant beamformers are released to perform a similar initial weight setting task, either for the same sector or for adjacent sectors.

As indicated previously, the down-converted antenna signals from the three different antenna elements $2_1$ to $2_3$ are applied to the main beamformer inputs by way of respective buffers 18. The delays introduced by these buffers are equal to or greater than the length (e.g. 60 $\mu$s) of a batch of pilot symbols present in each timeslot of the transmission signal sent by the mobile station. For example, in a CDMA system, the transmission signal may be divided up into timeslots of 20 symbols, of which the first 4 symbols in the timeslot are pilot symbols and the remaining 16 symbols are user-data symbols or control symbols. The use of the buffers 18 permits the same batch of pilot symbols to be used first by the assistant beamformers to arrive at an initial weight setting for the main beamformer, and then to be used again by the main beamformer itself once set up with that initial weight setting.

The buffers can, if desired, be replaced by switches which are initially off during operation of the assistant beamformers and are then activated, once the initial weight determination for the main beamformers has been made, to connect the antenna signals to the main beamformer inputs. In this case, of course, the pilot symbols used by the assistant beamformers are not available to the main beamformer.

Figure 3:
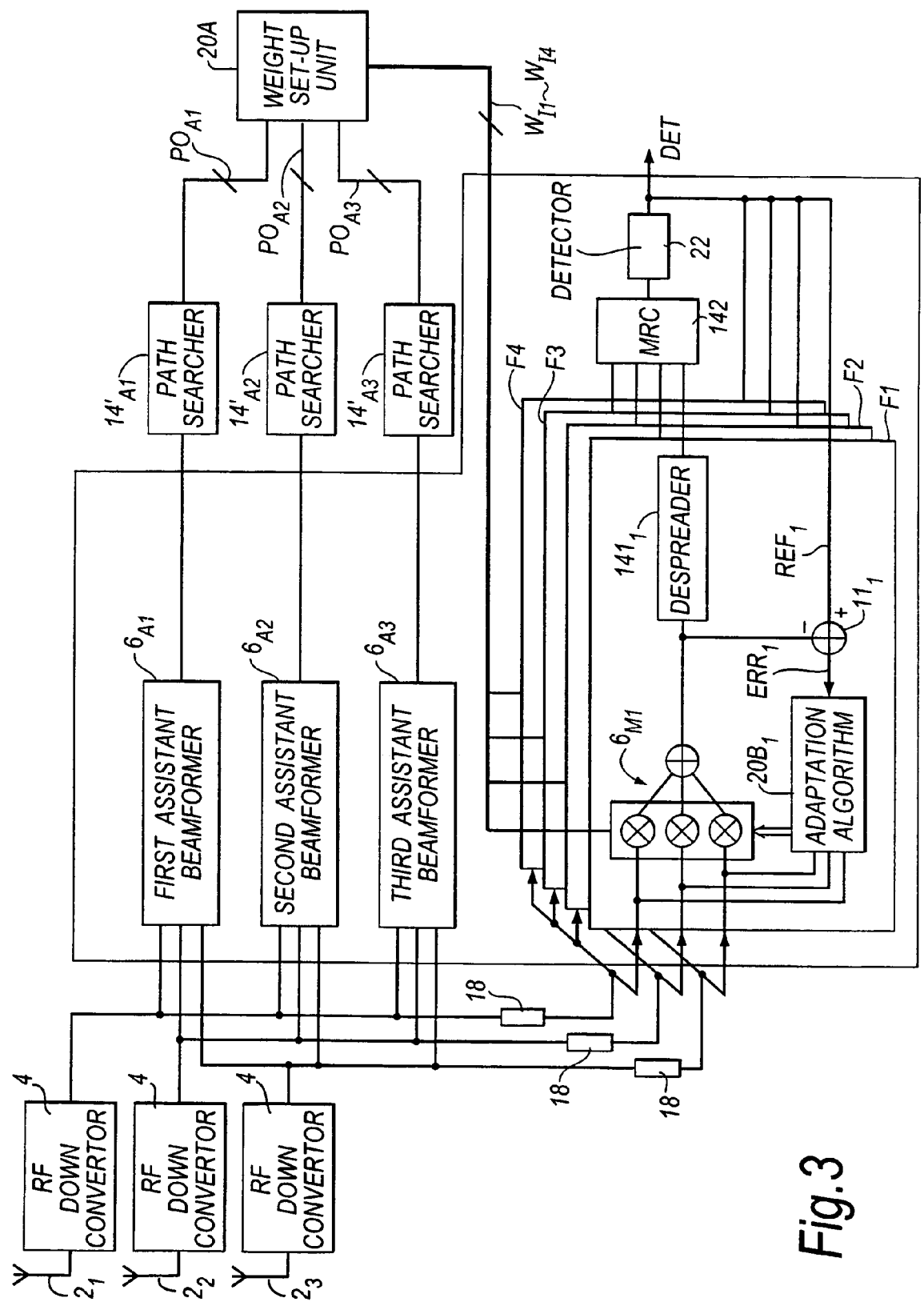
FIG. 3 shows a further block diagram showing, in more detail than FIG. 2, parts of the first embodiment.

FIG. 3 shows a modification to the first embodiment in which, in place of a common main beamformer $6_M$ for all RAKE fingers as in FIG. 2, each "main beamformer" RAKE finger F1 to F4 has its own main beamformer $6_{M1}$ to $6_{M4}$. In this case, as the main beamformer in each finger should be capable of operating independently of the other main beamformers, the functions of the comparator 16 and weight setup and adaptation portion 20 in FIG. 2 are redistributed in FIG. 3. Thus, the comparator and weight setup functions are performed in the FIG. 3 apparatus in a weight setup portion 20A and the adaptation function is performed separately in each finger with each finger having its own adaptation portion 20B.

As shown schematically in FIG. 3, each "main beamformer" finger F1 to F4 includes its own main beamformer $6_{M1}$ to $6_{M4}$, its own adaptation portion $20B_1$ to $20B_4$, its own subtractor $11_1$ to $11_4$ and its own despreader $141_1$ to $141_4$. A maximum ratio combiner (MRC) portion 142 is connected to receive respective outputs of the despreaders $141_1$ to $141_4$ in the four fingers. It will be appreciated that the despreaders $141_1$ to $141_4$ and the MRC portion 142 (together with other elements such as a path searcher, not shown) together make up the path searcher and RAKE combiner portion $14_M$ in FIG. 2.

In FIG. 3, the outputs of the assistant beamformers are coupled to respective path searcher portions $14'_{A1}$ to $14'_{A3}$ which do not have the RAKE combining function of the corresponding portions $14_{A1}$ to $14_{A3}$ in FIG. 2. Each path searcher portion $14'_{A1}$ to $14'_{A3}$ functions only to identify the n best paths (n=4, for example) within its corresponding assistant beam pattern and the best paths are not in this case combined to form one output signal per assistant beamformer as in the FIG. 2 embodiment. Instead, in FIG. 3 n output signals $PO_{A1}$ corresponding respectively to the n best paths of the first assistant beamformer are applied to the weight setup portion 20A. Similarly, n output signals $PO_{A2}$ corresponding respectively to the n best paths of the second assistant beamformer are applied to the weight setup portion 20A. Also, n output signals $PO_{A3}$ corresponding respectively to the n best paths of the third assistant beamformer are applied to the weight setup portion 20A.

In use of the FIG. 3 apparatus, the assistant beamformers operate as described previously with reference to FIG. 2, each of them having a differently-directed assistant beam pattern. For each assistant beam pattern, the n best paths are identified by the corresponding path searcher to produce a set of n per-path output signals for the assistant beam pattern concerned (the set $PO_{A1}$ for the beamformer $6_{A1}$, the set $PO_{A2}$ for the beamformer $6_{A2}$ and the set $PO_{A3}$ for the beamformer $6_{A3}$). The output signals (3n in total) are received in the weight setup portion 20A which compares the output signals (according to one or more quality measures such as CIR, SNIR, BER, SS etc. as before) to determine the initial weights $W_{I1}$ to $W_{I4}$ for the main beamformers.

For example, it may be that a mobile station is located in a direction intermediate between the main lobe directions of two different assistant beamformers. In this case, some of the best paths are likely to fall within the main lobe of one of those two assistant beamformers whilst the remainder fall within the main lobe of the other of the two assistant beamformers. In such a case, rather than use interpolation to set the initial weights for a common main beamformer as in FIG. 2, in the FIG. 3 apparatus it is possible to set the initial weights for the main beamformers on a path-by-path basis. Thus, if two of the best paths fall within the assistant beam of the first assistant beamformer and the remaining two best paths fall within the assistant beam pattern of the third assistant beamformer, the initial weights (e.g. $W_{I1}$, $W_{I2}$) for two of the main beamformers can be made equal to the first-assistant-beamformer weights whilst the initial weights ($W_{I3}$, $W_{I4}$) for the other two main beamformers are made equal to the third-assistant-beamformer weights.

After the initial weights for the different main beamformers have been selected the main beamformers operate independently for the different paths, and the signals for the different paths are despread in the fingers by the despreaders $141_1$ to $141_4$ and combined in the MRC portion 142. The detector 22 produces a detection signal DET which in this case is supplied as the reference signal REF to the subtractor 11 in each finger. The subtractor 11 receives the output signal of the main beamformer $6_{M1}$ to $6_{M4}$ in the finger concerned and subtracts it from the reference signal $REF_1$ to $REF_4$ to produce an error signal $ERR_1$ to $ERR_4$. This error signal is used by the adaptation portion to adjust the weights for the main beamformer in the finger.

It will be understood that in the FIG. 3 apparatus, because the main beamformers are provided on a per-finger basis, the main beam patterns can be adjusted, if desired, to have narrow main lobes directed closely to their respective desired paths, rather than having to have a large enough width to catch all the paths as in the case of the main beamformer in FIG. 2.

It is not always necessary for the initial weights for the different main beamformers to be different from one another. If the best paths are all confined to one assistant beam pattern, all the main beamformers can have their initial weights equal to the weights of the assistant beamformer concerned.

Figure 5:
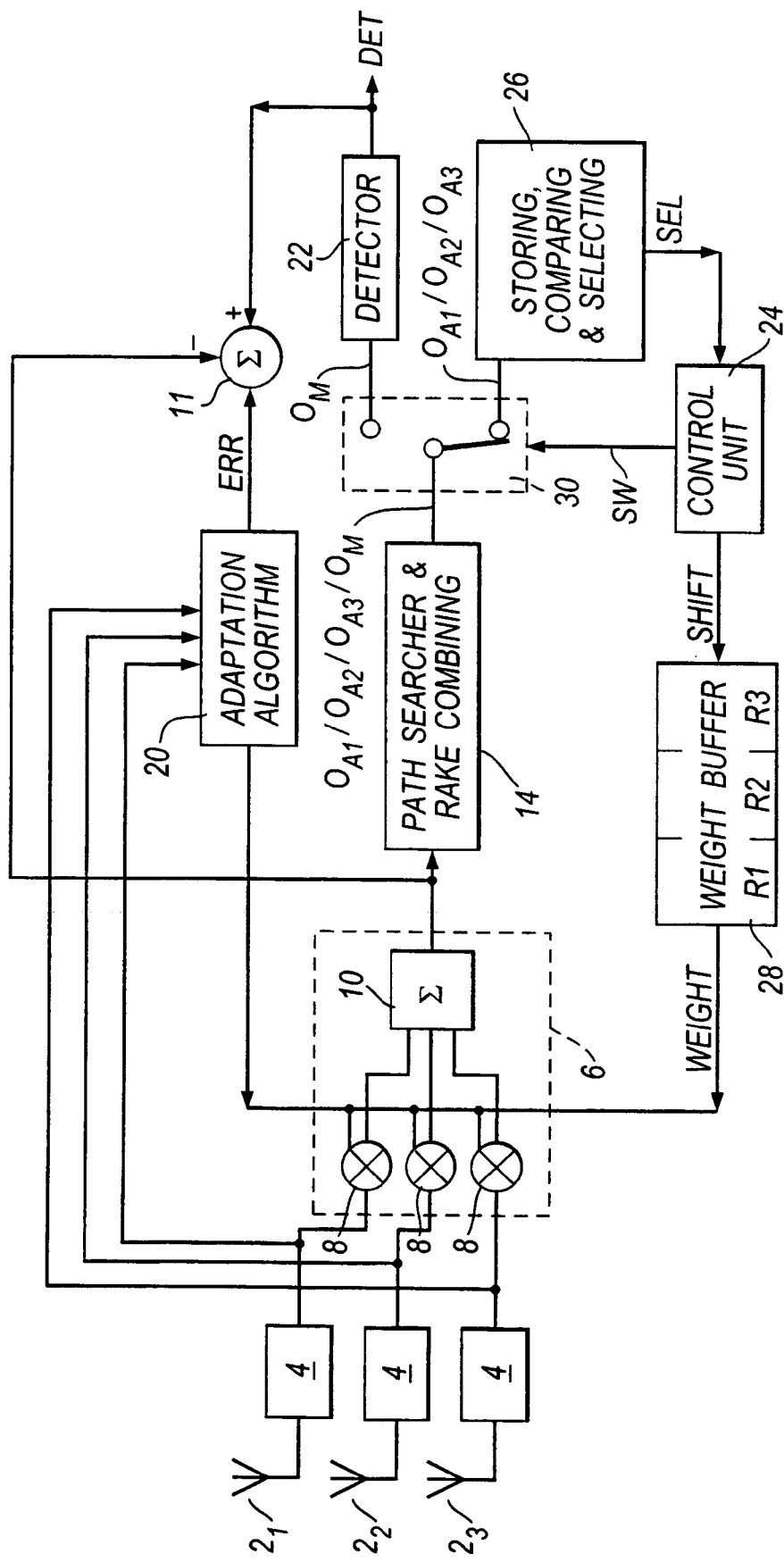
FIG. 5 is a block diagram showing parts of receiving apparatus according to a second embodiment of the present invention.

FIG. 5 shows a block diagram of a second embodiment of the present invention. This embodiment is also intended for use in a CDMA system which utilises PSAM. Components of the second embodiment which are the same as, or correspond to, components of the first embodiment are denoted by the same reference numerals.

The first embodiment of the present invention described with reference to FIG. 2 adopted a "parallel" approach in which each of the assistant beamformers and the main beamformer has its own individual hardware. In the second embodiment of the present invention, a "serial" approach is adopted, enabling the same hardware to be used to serve, at different times, as assistant beamformers and as a main beamformer.

In the FIG. 5 embodiment, a single beamformer 6 is employed which, as described previously, comprises complex number multipliers 8 and a combiner 10. Respective RF signals from the antenna elements to $2_1$ to $2_3$ are down-converted by the RF down-converters 4 to provide digital I-Q signal pair inputs for the beamformer 6.

An output signal of the path searcher and RAKE combining portion 14 is coupled to an input of a selection switch 30. The selection switch 30 has first and second outputs, the first output being connected to an input of a storing/comparing/selecting portion 26 and the second output being coupled to an input of a detector 22. A detection signal output DET of the detector 22 is coupled to an input of an adaptation algorithm portion 20. An output of the adaptation algorithm portion 20 is coupled to the multipliers 8 in the digital beamformer 6.

The FIG. 5 embodiment also comprises a control unit 24 having an input connected to a selection signal output SEL of the storing/comparing/selecting portion 26 and also having a switch control output SW. The FIG. 5 embodiment also comprises a weight buffer 28 having N storage regions, where N is the number of assistant beam patterns which the receiving apparatus is required to produce. In this example, N is 3, so there are 3 storage regions R1 to R3. Each storage region R1 to R3 has a storage capacity sufficient to store a complete set of the weight values for the digital beamformer 6. The weight buffer 28 is, for example, a cyclic shift register. The weight buffer 28 has an input which is coupled to a shift output SHIFT of the control unit 24. The weight buffer 28 also has a weight output WEIGHT which is connected to the complex number multipliers 8 in the digital beamformer 6.

Operation of the FIG. 5 embodiment will now be described with reference to FIG. 6.

Initially, the selection switch 30 is configured to connect its input to its first output (the output connected to the storing/comparing/selecting portion 26). Also, in the weight buffer 28 the weight settings $W_{11}$ to $W_{13}$ for the first assistant beamformer are held in storage region R1; the weight settings $W_{21}$ to $W_{23}$ for the second assistant beamformer are held in storage region R2; and the weight settings $W_{31}$ to $W_{33}$ for the third assistant beamformer are held in storage region R3.

Figure 6:
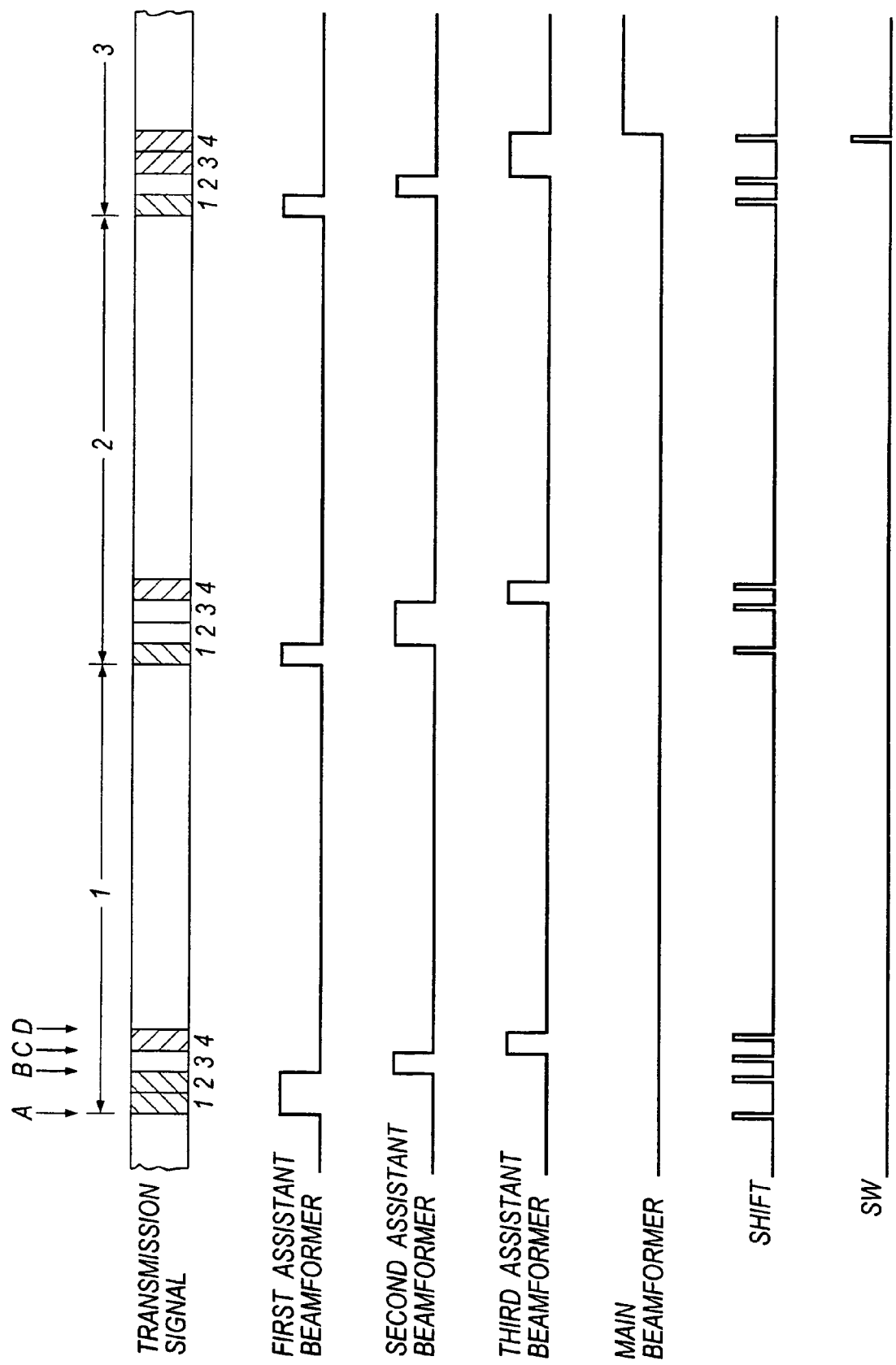
FIG. 6 shows a waveform diagram for use in explaining operation of the second embodiment.

At the start of a first timeslot TS 1 of the transmission signal received from a wanted user (mobile station), i.e. at time A in FIG. 6, the control unit 24 applies a shift signal SHIFT to the weight buffer 28. In response to this signal, the content of the storage region R1 of the weight buffer is transferred to the digital beamformer 6. At the same time, the weight buffer, being a cyclic shift register, shifts the contents of the storage regions R1, R2 and R3 to storage regions R3, R1 and R2 respectively.

At this time, therefore, the weight settings for the first assistant beamformer are loaded into the digital beamformer 6. Thus, a first assistant beam pattern is effectively formed by the receiving apparatus. This pattern is maintained for pilot-symbol periods 1 and 2 of TS 1.

As before, in each of these pilot-symbol periods the path searcher and RAKE combining portion 14 operates to determine the best available signals (e.g. the four best available signals if the RAKE has four fingers) within the assistant beam pattern. The path searcher and RAKE combining portion 14 combines the best signals, as appropriate, and produces, for each of the first and second pilot-symbol periods of TS 1, an output-signal sample $O_{A1}$ corresponding to the first beam pattern. These two output-signal samples $O_{A1}$ for the first assistant beamformer are transferred via the selection switch 30 to the storing/comparing/selecting portion 26. This portion 26 stores the two samples for later use.

At the end of pilot-symbol period 2 (time B) the control unit 24 produces another SHIFT signal, in response to which the second assistant beamformer weight settings (by this time held in storage region R1 of the weight buffer) are transferred to the digital beamformer 6. A cyclic shift of the weight settings in the weight buffer 28 is also performed, as at time A.

As a result, a second assistant beam pattern is effectively formed in pilot-symbol period 3 of TS 1. A single sample $O_{A2}$ of the output signal for the second assistant beam pattern is taken in this period, and the sample is again stored in the storing/comparing/selecting portion 26.

Next, at time C a further SHIFT signal is produced by the control unit 24, with the result that the weight settings for the third assistant beamformer are transferred from storage region R1 of the weight buffer 28 to the digital beamformer 6. The usual cyclic shift of the weight settings within the weight buffer is also performed.

In pilot-symbol period 4 of TS 1 a sample $O_{A3}$ is taken of the output signal of the third assistant beamformer and this sample is delivered by the selection switch 30 to the storing/comparing/selecting portion 26.

At the end of pilot-symbol period 4 of TS 1 (time D) a further SHIFT signal is produced by the control unit so that the weight settings for the first assistant beamformer are transferred from storage region R1 of the weight buffer to the digital beamformer, ready for the start of TS 2.

In TS 2 and 3 a similar sequence of operations is performed except that in TS 2 two samples $O_{A2}$ are taken for the second assistant beamformer and in TS 3 two samples $O_{A3}$ are taken for the third assistant beamformer. In this way, it can be seen that, in total over the three timeslots, four samples are taken for each of the first, second and third assistant beamformers.

At the end of pilot-symbol period 4 of TS 3, i.e. when all of the necessary samples have been taken, the storing/comparing/selecting portion 26 averages the four samples taken for each assistant beamformer and compares the averaged samples for the different assistant beamformers. From this comparison, one or possibly two assistant beamformers are selected as producing the best signal or signals, as in the first embodiment. This information is communicated by the portion 26 to the control unit 24 using the SEL signal.

In the control unit 24, if it is found that just one of the assistant beamformers has produced a clear "best" signal, the weight settings for that assistant beamformer are used as the initial weight settings for the main beamformer and, as described previously with reference to the first embodiment, these settings are provided by the control unit 24 to the beamformer 6. Alternatively, if there are two comparably-good signals from different respective assistant beamformers, an interpolation process based on the respective weight settings of the two assistant beamformers is applied to arrive at the initial weight settings for the main beamformer, as described previously. These weight settings are then applied to the digital beamformer 6.

Once the initial weight settings for the main beamformer have been determined by the control unit 24 in this way, the main beamformer starts to operate using the initial weight settings. The selection switch 30 is changed over so that the path searcher and RAKE combining portion 14 is connected to the detector 22 to form a feedback loop. The adaptation algorithm portion 20 then operates, as described previously, to optimise the weight settings and dynamically update them to meet the prescribed reception criteria.

In the above example there are 3 assistant beamformers and each assistant beamformer processes 4 samples of its output signal over a period of 3 timeslots. Those samples are then averaged to produce an average measure for each assistant beamformer. However, the invention is not limited to this. It is generally desirable for all of the assistant beamformers to sample at least one pilot symbol per timeslot, in case the channel variation from one timeslot to the next is significant. It is also generally desirable to use every pilot symbol which is available for the assistant beamformers, since otherwise the available pilot-symbol periods are not utilised to maximum effect. In some systems, it may also be possible to take just one sample per assistant beamformer, making the averaging step the unnecessary. In this case, though, the risk of an error in the initial weight setting is increased.

The serial approach described with reference to the second embodiment has the advantage of being highly economical in hardware terms. This economy is particularly significant in view of the fact that the path searcher and RAKE combiner portions 14 are expensive components of the receiving apparatus. In the first embodiment, they have a count of four, whereas in the second embodiment they have a count of just one.

Also, it is not necessary to activate the RAKE combining function in the path searcher and RAKE combiner portion 14 during the initial phase when the assistant beamformers are active. In this case, the path searcher function alone can provide a set of per-best-path output-signal samples for the currently-activated assistant beamformer in each sampling period, instead of a combined output-signal sample in which all the best paths are combined.

The main disadvantage of the serial approach is that it has a relatively long convergence time because it is not possible for the same batch of pilot-symbols to be used by all of the assistant beamformers simultaneously.

If desired, in the FIG. 5 embodiment more than one beamformer may be provided so that, after the initial weights have been determined, each path can have its own independent main beamformer, as in FIG. 3.

Figure 7:
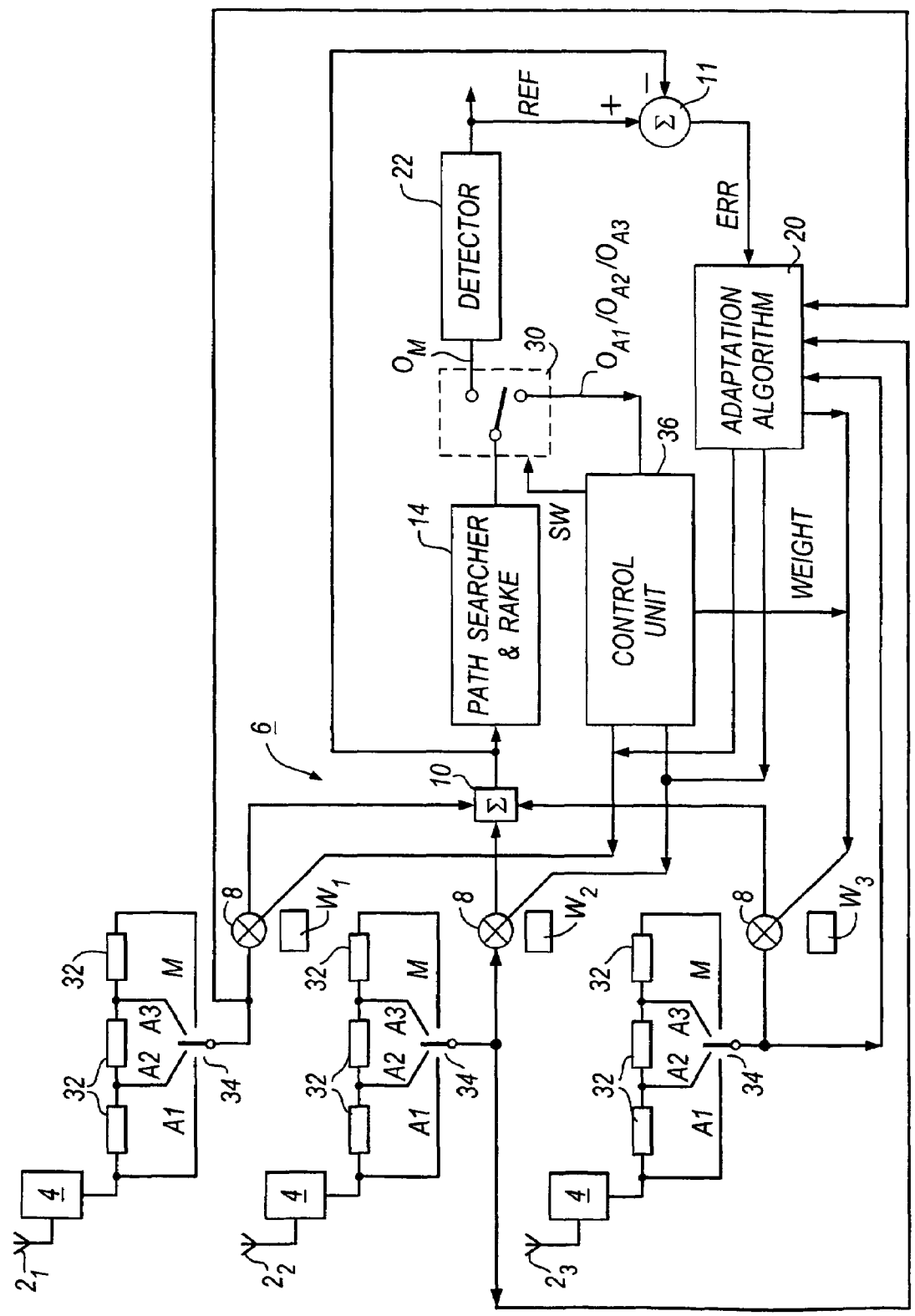
FIG. 7 is a block diagram showing parts of receiving apparatus according to a third embodiment of the present invention.

FIG. 7 shows parts of receiving apparatus according to a third embodiment of the present invention. In this embodiment, a so-called "hybrid" approach, combining the best features of the parallel approach of the first embodiment and the serial approach of the second embodiment, is adopted.

In the third embodiment, a single digital beamformer 6 is provided, made up of the complex number multipliers 8 and the combiner 10, as in the second embodiment.

In this embodiment, the beamformer inputs are provided via respective switches 34, each having four inputs A1, A2, A3 and M. The A1 input of each switch is coupled directly to an RF down-converter 4 which is in turn coupled to one of the antenna elements $2_1$ to $2_3$. The A2 input of each switch is coupled to the RF down-converter 4 via a first buffer $32_1$. The A3 input of the switch is coupled to the A2 input via a second buffer $32_2$ and the M input is coupled to the A3 input via a third buffer $32_3$. Each of the buffers $32_1$ to $32_3$ is constituted identically and introduces a delay equal to (or greater than) the duration of a batch of pilot symbols in a CDMA transmission timeslot.

In the third embodiment, a control unit 36 incorporates the functions of both the storing/comparing/selecting position 26 and the weight buffer 28 of the second embodiment, as well as control functions similar to those provided by the control unit 24 in the second embodiment.

The remaining elements of 20, 22 and 30 in the third embodiment correspond to the same elements in the second embodiment.

Figure 8:
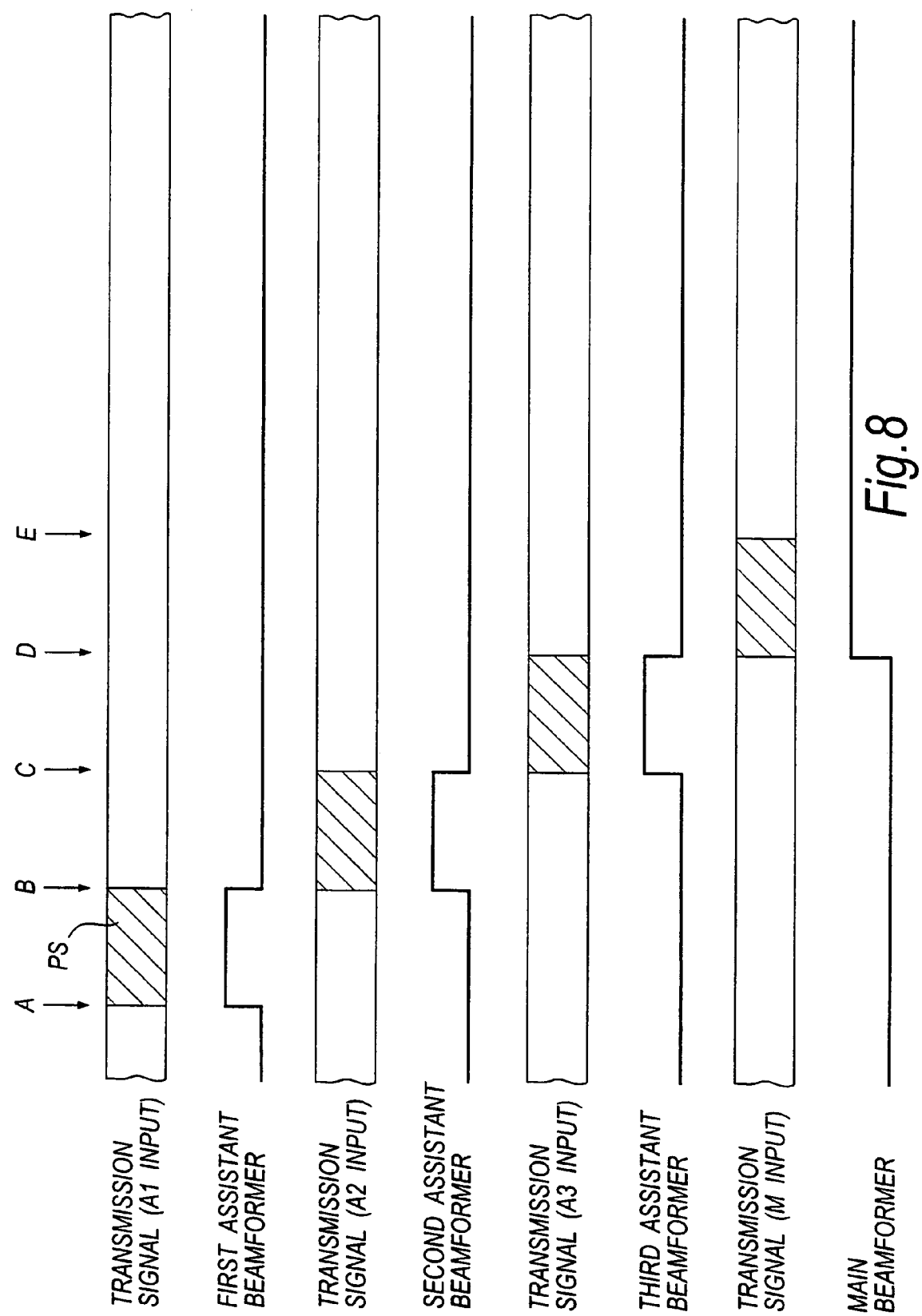
FIG. 8 shows a waveform diagram for use in explaining operation of the third embodiment.

Operation of the third embodiment will now be described with reference to FIG. 8. Initially, each of the switches 34 is configured to select its A1 input and the selection switch 30 is configured to the position shown in FIG. 7 itself which it connects the output of the path searcher and RAKE combiner portion 14 to the input of the control unit 36.

The sequence of operations is commenced (time A in FIG. 8) when the first pilot-symbol of a batch PS of pilot symbols in the current timeslot at the A1 input of each switch element appears. At this point, the control unit 36 causes the weight settings for the first assistant beamformer to be loaded into the complex number multipliers 8 of the digital beamformer 6. The output signal $O_{A1}$ of the path searcher and RAKE combiner portion 14 over the period occupied by the batch of pilot symbols is then stored in the control unit 36.

At the end of the batch PS of pilot symbols (time B in FIG. 8) the control unit 36 loads the weight settings for the second assistant beamformer into the complex number multipliers 8, and changes the setting of each switch 34 to select its A2 input. By this time, through the action of the first buffer $32_1$ interposed between the A1 and A2 inputs of each switch 34, the original batch PS of pilot symbols appears at the A2 input of each switch 34. The batch of pilot symbols is therefore processed again in accordance with the second assistant beam pattern determined by the weight settings for the second assistant beamformer and, again, the results $O_{A2}$ appearing at the output of the path searcher and RAKE combiner portion 14 are stored in the control unit 36.

Similarly, at time C the control unit 36 loads into the complex number multipliers the weight settings for the third assistant beamformer, and changes the setting of each switch 34 to select its A3 input. At this time, the original batch PS of pilot symbols is appearing at the A3 input of each switch 34, by virtue of the second buffer $32_2$ between the A2 and A3 inputs of each switch 34. Accordingly, the original batch PS of pilot symbols is processed again in accordance with the third assistant beam pattern and the results $O_{A3}$ are stored in the control unit 36.

At time D, the stored results $O_{A1}$, $O_{A2}$, $O_{A3}$ for the first, second and third beamformers are compared with one another and the initial weight settings for the main beamformer are calculated in the same basic way as described above for the first and second embodiments. These initial weight settings are applied by the control unit 36 to the complex number multipliers 8, and the switches 34 are reconfigured to select their respective M inputs, whereafter the main beamformer is activated.

At time E the selection switch 30 is changed over so that the output of the path searcher and RAKE combiner portion 14 is connected to the input of the detector 22. In this way, a feedback loop for the main beamformer weight settings is formed comprising the path searcher and RAKE combiner portion 14, the detector 22 and the adaptation algorithm portion 20.

At time E, also, the original batch of pilot symbols, now already processed by each of the three assistant beamformers, is available at the M input of each switch 34. Thus, the main beamformer can start to operate with the original batch of pilot symbols.

As described above, in the third embodiment the use of the buffers 32 enables the three assistant beamformers to use, one after the other, the batch of pilot symbols. Furthermore, the adaptation algorithm portion 20 is able to fine tune or train the weight settings with the aid of the same batch of pilot symbols.

Also, it is not necessary to activate the RAKE combining function in the path searcher and RAKE combiner portion 14 during the initial phase when the assistant beamformers are active. In this case, the path searcher function alone can provide a set of per-best-path output-signal samples for the currently-activated assistant beamformer in each sampling period, instead of a combined output-signal sample in which all the best paths are combined.

Figure 9:
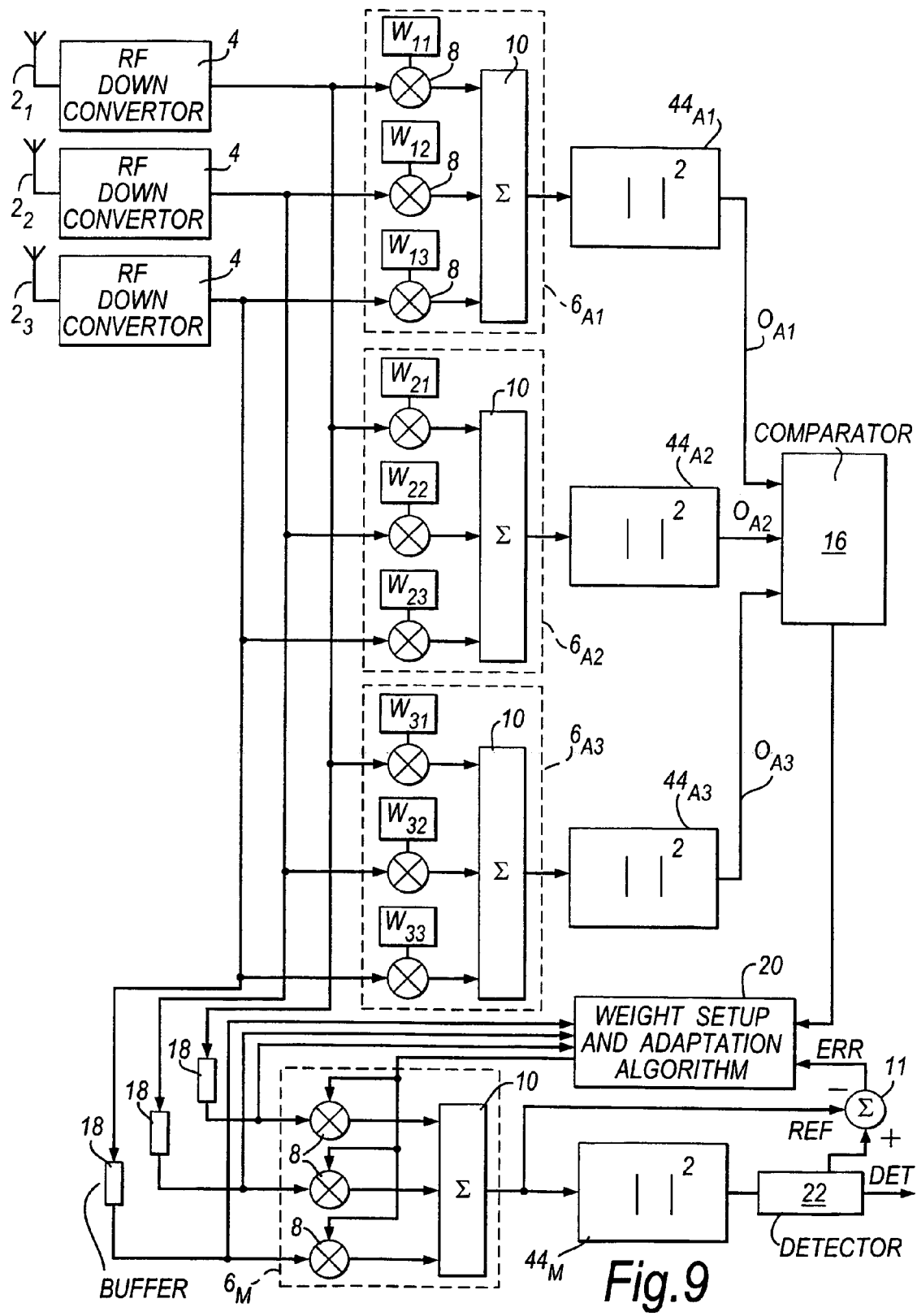
FIG. 9 is a block diagram showing parts of receiving apparatus according to a fourth embodiment of the present invention.

The present invention is not limited to being used in CDMA communication systems and can also be used in time-division-multiple access (TDMA) systems. FIG. 9 shows parts of a fourth embodiment of the present invention intended for use in such a TDMA system. In this system, the receiving apparatus is not of the RAKE type and accordingly the path searcher and RAKE combiner blocks 14 used in the first to third embodiments are omitted. In place of these, the fourth embodiment has squaring-operation portions $44_{A1}$ to $44_{A3}$ and $44_M$ connected to the assistant and main beamformer outputs. The squaring-operation portions 44 serve to produce measures of the powers of the beamformer outputs. Instead of the squaring-operation portions 44 it is possible to employ other means of determining signal power, for example means for correlating a predefined synchronisation sequence of the wanted signal. This would have the advantage of eliminating the interference power included with the wanted signal power.

The serial and hybrid approaches described with reference to the second and third embodiments respectively can also be applied in TDMA systems.

Figure 10:
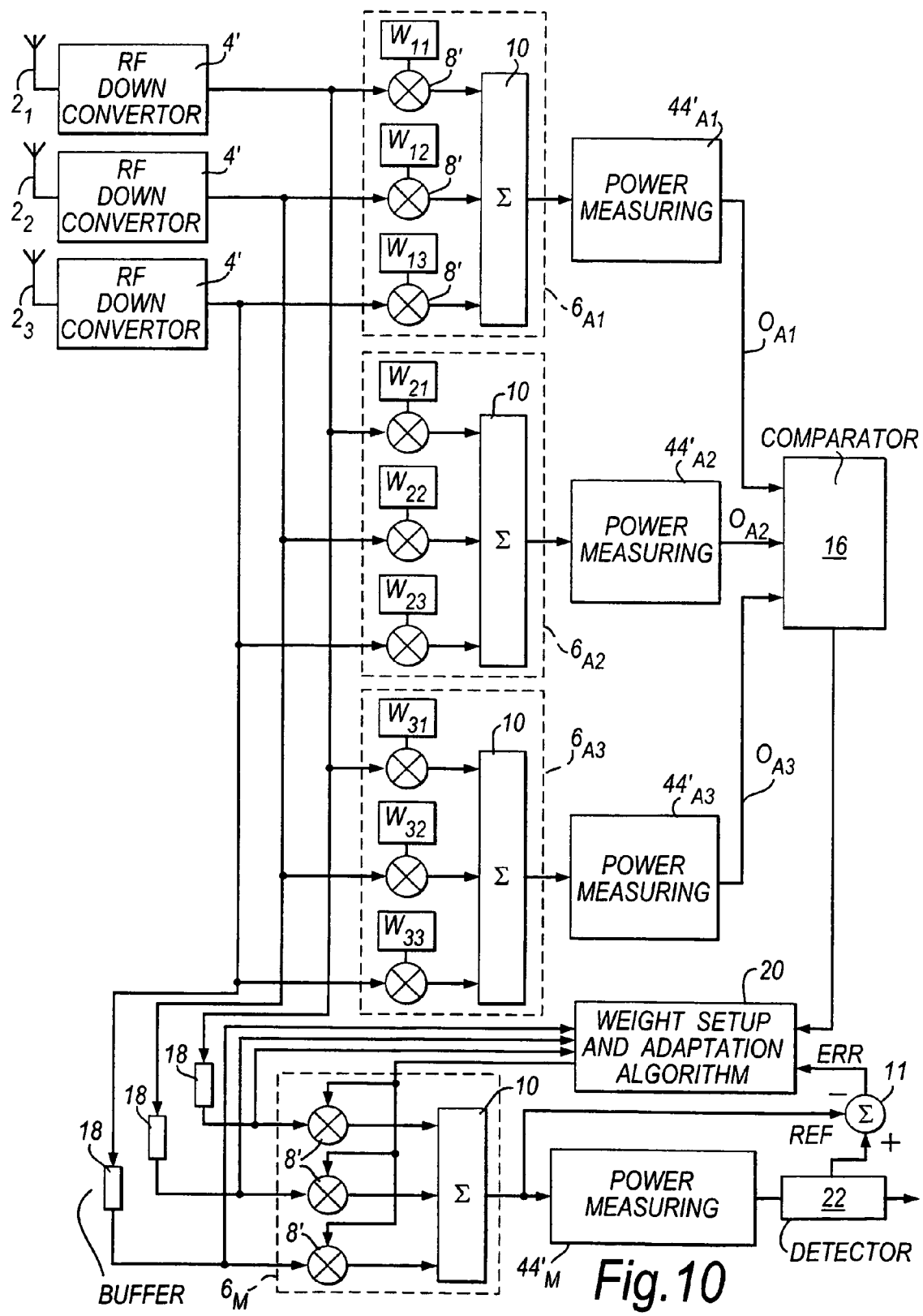
FIG. 10 is a block diagram showing parts of receiving apparatus according to a fifth embodiment of the present invention.

The present invention is also not limited to being applied in digital communications systems. For example, in a fifth embodiment of the present invention shown in FIG. 10, the present invention is applied to an analog communications system. In this case, the multipliers 8 used in the first embodiment are replaced by attenuators and phase shifters 8'. Similarly, the path searcher and RAKE combiner portions 14 used in the first embodiment are replaced by power measuring portions 44'. The RF down-converters 4 used in the first embodiment are also changed to being corresponding analog elements 4'.

FIG. 11 shows the sequence of communications between a mobile station and a base station when the base station grants the mobile station a channel (traffic or control channel) and that channel is activated.

Firstly, using a dedicated control channel (the random access channel RACH) the mobile station informs the base station that it is requesting a channel. A time $T_A$ later, the base station informs the mobile station, via another dedicated control channel (the access grant channel AGCH), that it is granting the base station a particular channel. The communication from the base station to the mobile station via the AGCH specifies parameters necessary for establishing the channel, such as, for example, the frequency/time/code which has been allocated by the base station to the granted channel concerned.

A time $T_T$ after the transmission of the channel grant information on the AGCH, the mobile station activates the granted channel. From this point onwards, the mobile station transmits information to the base station in predetermined frames. Each frame is divided into 16 timeslots, each timeslot commencing with a batch of pilot symbols P and continuing with user-data or control symbols. For example, $T_A$ may be of the order of 100 ms. The timeslot may consist of 20 or 40 symbols, of which four symbols may be pilot symbols. The duration of a complete frame is, for example, 10 ms and each time slot is of duration 625 $\mu$s. In a timeslot of 20 symbols, this equates to a symbol rate of 32Ksymbol/s.

The invention claimed is:

1. Receiving apparatus, for receiving a transmission signal in a cellular mobile communications system, comprising:
   a main beamformer which processes received signals, representing said transmission signal, in accordance with a main beam pattern that is determined by beam control information applied thereto, said main beam pattern being adjusted as necessary during use of the receiving apparatus to facilitate reception of said transmission signal;
   an assistant beamformer which, in an initial operating phase of the apparatus, processes such received signals in accordance with each one of a plurality of different assistant beam patterns to derive one or more output signals corresponding to the assistant beam pattern concerned, each such pattern being determined by beam control information corresponding individually thereto; and
   a beam control information setting unit which employs said output signals and said beam control information corresponding respectively to said assistant beam patterns to make an initial estimate of said beam control information for said main beamformer.

2. Receiving apparatus as claimed in claim 1, wherein said assistant beamformer has a plurality of individual assistant beamformer units that are operable simultaneously to process said received signals in accordance with different respective ones of said assistant beam patterns.

3. Receiving apparatus as claimed in claim 2, further comprising a plurality of buffers, each having an input connected for receiving a corresponding one of said received signals and an output connected to an input of said main beamformer, for applying the received signals to the main beamformer a predetermined delay period after those signals are applied to the assistant beamformer.

4. Receiving apparatus as claimed in claim 1, wherein said assistant beamformer has a single beamformer unit operable to process the received signals in accordance with each of said assistant beam patterns in a predetermined sequence, the apparatus further comprising an output signal storage unit for storing, for each assistant beam pattern of said sequence, one or more samples of said one or more output signals produced by said single beamformer unit.

5. Receiving apparatus as claimed in claim 4, wherein said single beamformer unit is also employed by the said main beamformer, after said initial operating phase, to process said received signals in accordance with said beam pattern.

6. Receiving apparatus as claimed in claim 4, further comprising a beam control information storing unit for storing said beam control information corresponding to each assistant beam pattern and for applying to the single beamformer unit the stored beam control information corresponding to each in turn of said assistant beam patterns.

7. Receiving apparatus as claimed in claim 6, wherein the beam control information storing unit comprises a cyclic shift register.

8. Receiving apparatus as claimed in claim 4, wherein at least two samples of said output signal are stored for each assistant beam pattern, the apparatus further comprising an averaging unit for averaging the stored output-signal samples for each assistant beam pattern.

9. Receiving apparatus as claimed in claim 4, further comprising a buffer corresponding to each said received signal, said buffer being operable to apply the same received signals, representing a predetermined portion of the transmission signal, a plurality of times in succession to said single beamformer unit, the assistant beamformer being operable to process the received signals applied thereto in accordance with a different one of said assistant beam patterns at each of said times.

10. Receiving apparatus as claimed in claim 9, wherein said buffer is also operable to apply the same received signals to said single beamformer unit once again following said plurality of times, thereby to enable said main beamformer to process those received signals in accordance with said main beam pattern.

11. Receiving apparatus as claimed in claim 9, wherein said buffer comprises a switch having a first set of inputs corresponding respectively to said assistant beam patterns, the inputs of the fast set being connected one to the next by respective buffer elements, and also having an output connected to an input of said single beamformer unit.

12. Receiving apparatus as claimed in claim 10, wherein:
    said buffer comprises a switch having a first set of inputs corresponding respectively to said assistant beam patterns, the inputs of the fast set being connected one to the next by respective buffer elements, and also having an output connected to an input of said single beamformer unit; and said switch has a further input corresponding to said main beam pattern, which further input is connected to the last input of said first set by a further such buffer element of the said buffer.

13. Receiving apparatus as claimed in claim 1, wherein said assistant beamformer includes a path searcher which, during processing of the received signals in accordance with each different assistant beam pattern, identifies a plurality of best paths for the assistant beam pattern concerned.

14. Receiving apparatus as claimed in claim 13, wherein said assistant beamformer derives such an output signal per best path identified by the said path searcher.

15. Receiving apparatus as claimed in claim 13, wherein said assistant beamformer further includes a RAKE combiner which combines signals corresponding to the identified best paths, and the assistant beamformer derives one such output signal representing those combined signals.

16. Receiving apparatus as claimed in claim 1, comprising a plurality of RAKE fingers, each including such a main beamformer, and said beam control information setting unit makes such an initial estimate of the beam control information for the main beamformer in each such RAKE finger.

17. Receiving apparatus as claimed in claim 16, wherein the initial estimates for at least two of the RAKE fingers of said plurality can be different from one another.

18. Receiving apparatus as claimed in claim 1, wherein the beam control information setting unit compares one or more predetermined characteristics of said output signals corresponding to said different assistant beam patterns to identify one or more best assistant beam patterns.

19. Receiving apparatus as claimed in claim 18, wherein said predetermined characteristics include one or more of the following: a carrier-interference ratio, a signal-noise and interference ratio, a bit error rate, and a signal strength.

20. Receiving apparatus as claimed in claim 19, wherein, if comparison of the output signals in respect of a first one of said predetermined characteristics is inconclusive an identifying the said one or more best patterns, said beam control information setting unit compares the output signals in respect of a second one of the predetermined characteristics different from the said first predeterminded characteristic.

21. Receiving apparatus as claimed in claim 18, wherein, when one best assistant beam pattern is identified, said beam control information setting unit makes said initial estimate the same as the beam control information corresponding that one identified assistant beam pattern.

22. Receiving apparatus as claimed in claim 18, wherein the beam control information unit includes an interpolator which, when two or more best assistant beam patterns are identified, determines said initial estimate by interpolating from the beam control information corresponding to the identified assistant beam patterns.

23. Receiving apparatus as claimed in claim 22, wherein in such interpolation the identified assistant beam patterns are weighted according to one of said predetermined characteristics.

24. Receiving apparatus as claimed in claim 18, wherein, when two or more best assistant beam patterns are identified, the beam information control unit uses the beam control information for each identified best pattern to provide said initial estimate for at least one RAKE finger of said plurality.

25. Receiving apparatus as claimed in claim 1, wherein said transmission signal is a CDMA signal.

26. Received apparatus as claimed in claim 1, wherein said transmission signal is a TDMA signal.

27. Receiving apparatus as claimed in claim 1, wherein said received signals are digital signals and said main and assistant beamformers are digital beamformers.

28. Receiving apparatus as claimed in claim 1, wherein said assistant beamformer processes those portions of the received signals that represent pilot symbols included in the transmission signal.

29. Receiving apparatus as claimed in claim 1, wherein said received signals are derived from different respective antenna elements.

30. Receiving apparatus as claimed in claim 29, wherein the number of different assistant beam patterns of said plurality is greater than the number of antenna elements.

31. Receiving apparatus as claimed in claim 29, wherein said antenna elements are spaced non-uniformly one from the next.

32. Receiving apparatus as claimed in claim 29, wherein at least two of said antenna elements are arranged in different planes.

33. Receiving apparatus as claimed in claim 1, wherein said beam control information corresponding individually to each assistant beam pattern serves to control one or more of the following characteristics of the assistant beam pattern concerned: the pointing directions, shape and width of the beans embodied in the beam pattern.

34. Receiving apparatus as claimed in claim 33, wherein at least one of said beam pattern characteristics is different in at least two of said assistant beam patterns.

35. A method of receiving a transmission signal in a cellular mobile communications system, in which received signals representing said transmission signal are processed in accordance with a main beam pattern that is determined by beam control information corresponding thereto, and the main beam pattern is adjusted as necessary to facilitate reception of said transmission signal;

the method including an initialisation step of: processing such received signals in accordance with each one of a plurality of different assistant beam patterns to derive one or more output signals corresponding to the assistant beam pattern concerned, each such pattern being determined by beam control information corresponding individually thereto; and employing said output signals and said beam control information corresponding respectively to said assistant beam patterns to make an initial estimate of said beam control information corresponding to said main beam pattern.

36. Receiving apparatus, for receiving a transmission signal in a cellular mobile communications system, comprising:

main beamformer means operable to process received signals, representing said transmission signal, in accordance with a main beam pattern that is determined by beam control information applied thereto, said beam pattern being adjusted as necessary during use of the receiving apparatus to facilitate reception of said transmission signal;

assistant beamformer means operable, in an initial operating phase of the apparatus, to process such received signals in accordance with each one of a plurality of different assistant beam patterns to derive one or more output signals corresponding to the assistant beam pattern concerned, each such pattern being determine by beam control information corresponding individually thereto; and beam control information setting means operable to employ the said output signals and said beam control information corresponding respectively to said assistant beam patterns to make an initial estimate of said beam control information for said main beamformer means.

* * * * *